Sept. 13, 1960 G. DE VARDA 2,952,592
MULTICELL CLOSED CIRCUIT FURNACE AND FUSED SALT ELECTROLYSIS
PROCESS FOR ALUMINIUM PRODUCTION FROM ALUMINIUM OXIDE
Filed May 29, 1956  5 Sheets-Sheet 1

INVENTOR.

Giuseppe de Varda

INVENTOR.
Giuseppe de Varda

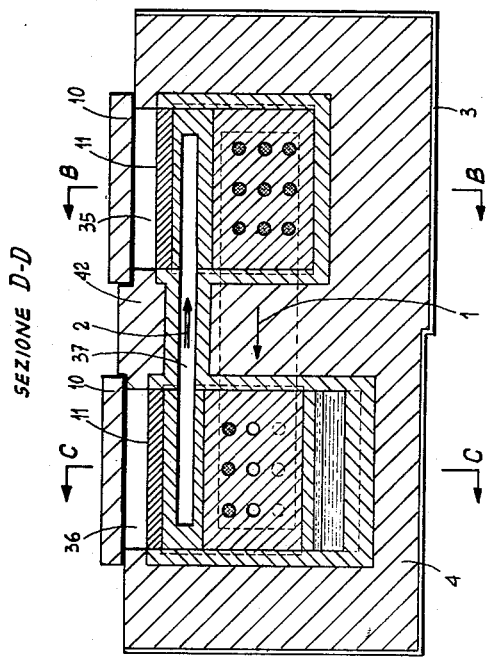
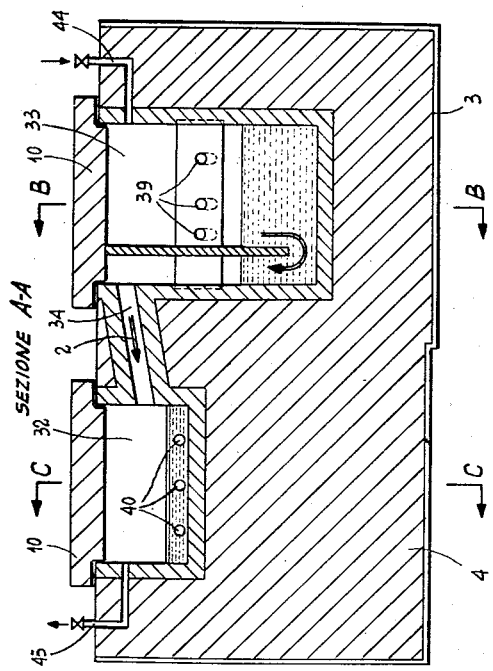

United States Patent Office 2,952,592
Patented Sept. 13, 1960

2,952,592

MULTICELL CLOSED CIRCUIT FURNACE AND FUSED SALT ELECTROLYSIS PROCESS FOR ALUMINIUM PRODUCTION FROM ALUMINIUM OXIDE

Giuseppe de Varda, Milan, Italy, assignor to Montecatini, Societa Generale per l'Industria Mineraria e Chimica, a corporation of Italy Filed May 29, 1956, Ser. No. 587,985

Claims priority, application Italy June 8, 1955

47 Claims. (Cl. 204—67)

The present invention relates to the production of aluminium by means of fused salt electrolysis, i.e., from alumina dissolved in a bath of fused salts. In particular the invention concerns an improvement in the furnaces and methods for the production of aluminium described in the applicant's copending patent application, Serial No. 480,509, filed January 7, 1955.

It is an object of the present invention to enable reduction of labour, installation costs and running costs, especially unit consumption of power, as well as inconvenience of operation, and to increase output capacity, as compared not only with conventional methods and furnaces now in use, but also with the methods and furnaces proposed in the aforesaid copending application.

It is a further object of the invention to permit treatment of kinds of alumina less pure than or cheaper than the conventional Bayer alumina while producing higher grade aluminium, attaining an effect of progressive "classification" from cell to cell in the interior of the furnace.

Another object of the invention is to permit conversion from operation with a number of cells in open series, as described in the above mentioned patent application No. 480,509, to operation with a closed multicell circuit, and vice versa. The purpose is also to permit the creating of a main circulation flowing from cell to cell which is in harmony with the internal circulations of the individual cells, which are also in closed cycles (secondary circulation). The latter is accomplished without creating counter-currents or constraining the bubbles of anodic gas to follow longer paths, as happens if a number of furnaces of the conventional kind, equipped with horizontal electrodic surfaces, are connected to create therethrough a (main) circulation of the fused salt bath.

It is a still further object of the invention to minimize or eliminate temperature variations in the individual cells, as well as to restrain heat dispersion, to a substantially greater extent than is possible with furnaces as used or proposed prior to the date of said application No. 480,509, particularly when operating with a normally closed furnace in which the feeding of alumina and, in certain cases, also the tapping of the metal produced, is independent of the normal operation of the individual electrolysis cells, so that feeding, and possibly tapping need not require the furnace to be opened, and the furnace can even run without crust formation and without anode effects.

These objects and advantages, and others that will be evident from the following description, are attained according to the present invention, which provides a method of production of aluminium by electrolysis of alumina dissolved in a bath of fused salts, in a multi-cell furnace with individual electrolysis cells having inclined, stationary and anodically consumable bi-polar intermediate electrodes of carbon, including graphite, characterized in that said bath is caused to circulate by difference of head within the furnace during the electrolysis, electric current is passed through the cells in series, preferably in a sense opposed to the sense of circulation of the bath, and the feeding of alumina is effected at one or more points of the circuit while tapping of the aluminium produced is effected individually from each cell.

For carrying out said method a furnace is employed having electrolysis cells formed by stationary, preferably inclined, electrodes with anodes that are restorable on their consumed faces, said cells being disposed in groups with bi-polar intermediate electrodes and with terminal electrodes, at least two of which are provided with current-carrying metallic nipples, and with individual chambers, one below each electrolysis gap for collecting metallic aluminium, which furnace is characterized in that said cells are provided with individually removable heat-insulating covers and intercommunicate by means of ducts at such levels as to permit the passage of electrolytic bath from one cell to another, and in that at least two groups of cells are connected with each other in series through intercommunication and circulation means for the fused bath between the interelectrode gaps, and by circulating and lifting means to establish the liquid circuit, as well as electrically through the respective terminal nipples or studs to establish the electric circuit, said cells being arranged in the form of a closed necklace with two elongated branches disposed on opposite sides of a longitudinal wall. This wall of refractory and electrically insulating material may have any form whatsoever, such as straight-lined, or curved, or S-shaped.

The term "necklace" and "collapsed necklace" as herein applied to an arrangement of electrolytic cells is to be understood as referring to at least two groups of cells, but may also comprise feeding stations and terminal chambers, inter-connected as hereinbefore recited, generally speaking in chain disposition like that of the beads of a necklace and wherein the means comprising the electrical circuit and enabling the fused bath circulation represent a double string. "Collapsed" is to be understood as defining the arrangement of the two branches (or of the two or more groups extending from "clasp" to "bight") in juxtaposition on opposite sides of said longitudinal wall which forms a common side wall for the cells in the two branches. At the "bight" end of the two groups the inter-communicating cells, like each two adjacent cells in the groups, have unit difference of level; and at the other end, which corresponds to the "clasp" of the necklace, the lifting means are provided to raise the bath liquid through the total difference of level of the necklace of cells to enable circulation of bath liquid around the necklace under gravity.

There may be provided in the same furnace, viz., within one single shell of metal sheet lined with insulating and refractory material, two or more necklaces of cells, preferably electrically in parallel with each other and preferably arranged with "clasp" adjacent each other and separated by a transverse wall of like material and with function similar to that of the longitudinal intermediate walls.

In a closed circuit furnace as aforesaid the cells may be covered by a roof of removable tiles of heat-insulating, refractory, preferably a porous and light material adapted to allow passage of the electrolysis gases and/or provided, if desired, with holes to facilitate the passage of such gases. The furnace may further have removable external covers of refractory and heat insulating material.

Removal of the tiles and external covers above or in the vicinity of a cell wherein the anode surface is to be restored causes loss of heat and local increase of viscosity or solidification of the bath liquid whereby circulation thereof into and from said cell is stopped during the restoring operation. Thereafter, replacement of the tiles and external covers enables the local internal temperature to rise again, thereby liquefying or reducing the viscosity of the bath liquid to enable the circulation of bath liquid through the anodically restored cell to recommence automatically.

There may further be provided means for adjusting or closing individually the ducts, provided in massive blocks superimposed on the electrodes, for bath circulation between adjacent cells, said means preferably being constituted by plugs slidable in holes in said blocks to intersect said ducts, the plugs being adapted to be fixed at various levels and actuable from above the cells, preferably from above the aforesaid removable tiles.

Circulation by difference of liquid head involves a first cell with maximum level and a last cell with minimum level; between them the invention provides means for lifting the bath, arranged preferably in association with a pair of closed terminal chambers, in the interior of the furnace, in which the bath is lifted from said last cell with minimum level to said first cell with maximum level, preferably at the "clasp" end of each necklace of cells.

An important feature of the furnace according to the invention is that said terminal chambers and ducts interconnecting the branches of the necklaces for the bath circulation are provided solely in internal walls of the electrolysis furnace, that is, not merely inside a determined apparatus assembly, but in an internal zone surrounded by electrolysis cells, and also tapping pockets each in communication with one of the collecting chambers are thus provided, namely in said longitudinal wall between the two branches of the elongated necklace of cells.

According to the invention, it is also convenient to provide for each individual cell a stable electric contact between the cathode and the metal collected below, in the respective lower metal collecting chamber; for this purpose it is convenient to provide the carbon cathode with one or more carbon strips extending as far as the bottom of the respective lower chamber, so as to ensure the existence of a fixed electric connection between said cathode surface and the aluminium that has flown down along said surface and has collected on the bottom of said lower chamber.

The consumption of alumina in the course of electrolysis is conveniently made up for at one or more feeding stations of the internal circuit, preferably outside the cells or electrolysis gaps. At said feeding stations, alumina is, for instance, made to fall from above by means of a measuring device in a continuous manner upon the underlying surface of liquid bath, which is thus continually renewed, conveniently circulated and kept at temperatures higher than what is hereinafter called "critical temperature," by means of a hot and well-insulated chamber; it being understood that the term "critical temperature" as employed herein refers to the temperature at which a determined bath of fused salts becomes so viscous as to prejudice the circulation in the furnace of the present invention. Of course, the "critical temperature" is always higher than the temperature of solidification of the bath in question.

It is known that it is not practicable nor convenient to prevent solidification of the bath surface in conventional furnaces, that is, to overcome the tendency to form surface crusts, whence in conventional furnaces it is necessary to expend mechanical effort to introduce alumina into the baths. In my furnace this operation becomes of minor or no importance.

The aluminium produced in the individual cells is tapped from the tapping pockets provided in the furnace wall intermediate between the two branches of the circuit, when said wall has attained elevated and practically uniform temperature. It has not heretofore been known to provide tapping pockets in hot internal walls, which walls are without or almost without any temperature gradient and are at practically uniformly stabilized temperatures higher than the critical temperatures of the bath and metal. On the other hand, the idea is not new to provide tapping pockets for aluminium which are based upon the principle of communicating vessels and provided in external walls of conventional furnaces for aluminium electrolysis with horizontal bath layers. However, it was never possible to embody such tapping pockets in practice, which with conventional furnaces could be built only in external furnace walls, and were prejudiced by the existence of a more or less steep thermal gradient according to the heat-conductivity of the material employed in making said external walls and the respective thicknesses. Even if the insulation is improved, the constructive requirements of conventional furnaces have never in practice permitted operation with relative continuity and tranquility of such external tapping pockets, which tended to clog, e.g. by local solidification of the bath or metal. These inconveniences were increased in conventional furnaces with horizontal bath layers by inevitable functional irregularities of the cathodic bottom. Finally, in conventional furnaces for the electrolysis of aluminium, for obvious reasons, internal separating walls of inert refractory material have never been proposed.

The present invention constitutes not only an improvement upon the method and means of the aforesaid patent application No. 480,509 and a considerable technical progress over the type of process and furnace now in use employing horizontally opposed electrode surfaces, but also over the known proposals to connect in a liquid series a certain number of electrolysis furnaces for fused salt electrolysis, in such a way as to pass the bath in a closed circuit through a determined number of furnaces having conventional constructional features, such as that of U.S. Patent 2,451,490. Said patent proposed feeding of fused bath rich with alumina to a first furnace of a series and bringing of the bath having low $Al_2O_3$ content as it leaves the last furnace of the series, back to its initial composition before re-introducing it into the first furnace of the series; and, for this purpose, solubilisation of the alumina contained in cheap bauxitic ore, as well as elimination with convenient subsequent treatments of the impurities and slag from the bath so enriched with $Al_2O_3$. Embodiment of that proposal in industrial practice would however involve the necessity of facing inconveniences and of overcoming hindrances which are insurmountable in practice and which are due essentially to the necessity of keeping the fluorinated bath, which is very active chemically, at elevated temperatures of the order of 950–1000° C. at all points of the circuit and, therefore, also in the connecting sections outside the furnaces. Otherwise viscosity hinders circulation, while solidification of the bath may even cut it off (850–900° C.). It will suffice to mention the following: the length of the circuit that the bath has to pass through is substantial, each individual furnace being several metres long, the surfaces transmitting heat therefore become huge, and so does the head of liquid necessary to promote circulation of the bath from the first to the last furnace of the series; the operations for starting and stopping the liquid circuit as well as those for adjusting the quantity of bath to be conveyed are extremely difficult; the numerous external paths that have to be brought above the so-called critical temperature of the bath when starting and kept at such temperature during electrolysis and during interruptions of the process; the fact that the internal, secondary circulation in the individual conventional furnaces is altered in an irrational manner by effect of the unidirectional, main, circulation from one furnace to the other, as well as the circumstance that the adjustment of the electrodic spacing between the carbon anode and the cathode metal and the tapping of the metal in the individual furnaces of the circuit also become delicate operations in view of the requirements relative to constancy of temperature and quantity of flow of the bath flowing through the individual furnaces of the circuit; and the high volumes and quantities of flow of the bath in cycle as related to the unit production of aluminium per day.

A main circulation of the bath partly internal to the furnace, of the type employing bi-polar electrodes, is described in Swiss Patent No. 293,187. However in that patent the circulation is not closed inside the furnace and above all the electrolysis bath is constituted by aluminium chloride, which does not consume the electrode (as is the case with alumina) in the course of electrolysis, but develops chlorine at the anode whence the furnace of the cited Swiss patent has to be kept hermetically closed. It is adapted to operate at 700° C. and could not be utilised in the electrolysis of alumina in fluorinated fused baths with consumable carbon anodes.

In the patents mentioned there is no foreshadowing of the constructive and operative principles which make it advantageously possible to practice fused bath electrolysis for aluminium production according to the present invention.

An embodiment of a furnace, its mode of operation and the electrolysis process carried out therewith, all in accordance with the present invention, will be described by way of example and without limitation, with reference to the accompanying diagrammatic drawings illustrating one embodiment wherein:

Figure 3 shows on a larger scale a portion of Figure 2a:

Figure 6 is a transverse section on the line A—A of Figures 2a and 2b; and

Figure 7 is a transverse section on the line D—D of Figures 2a and 2b.

Figure 1:
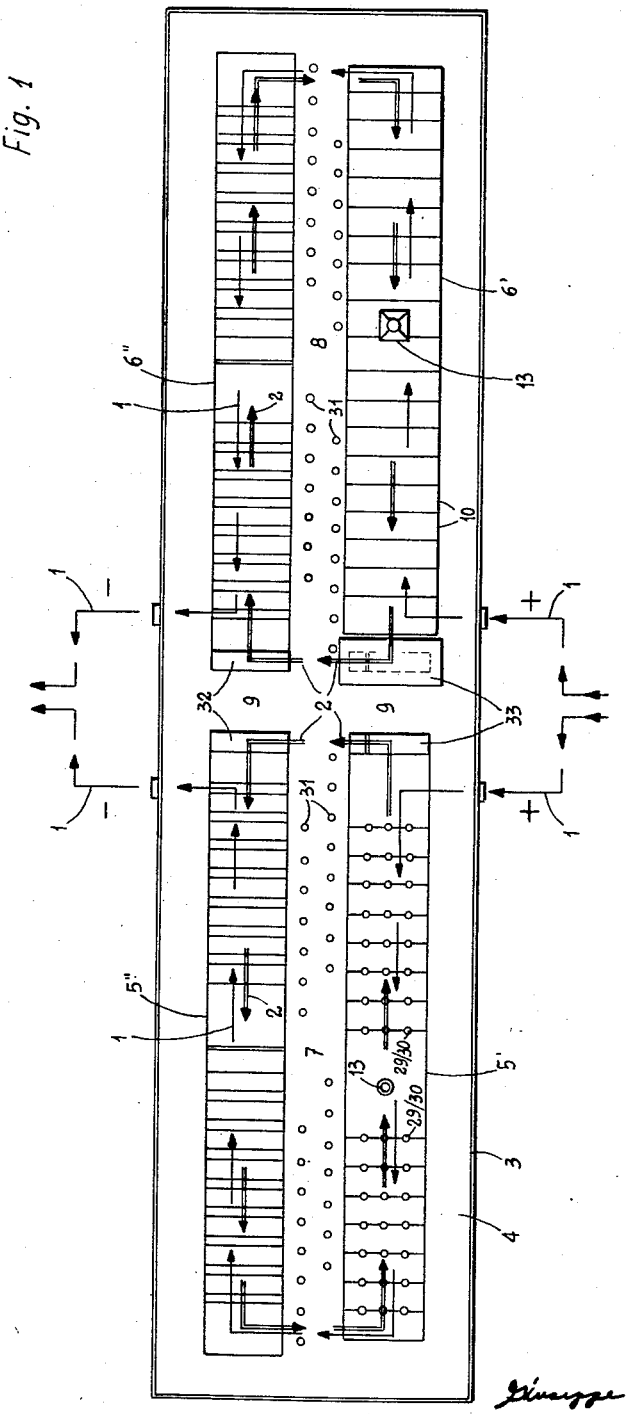
Figure 1 is a plan view of a "twin" furnace according to the invention, which comprises two necklaces of cells, each necklace having four groups of electrolysis cells in series. The cells shown in the upper row are uncovered, those in the lower row to the right completely covered, and in the lower row to the left the cells are shown without external cover but with a roof of intermediate tiles.

The furnace in the form of a collapsed necklace with narrowed branches according to the present invention may be arranged (as seen in plan) in the various configurations, for instance in the form of a rectangle, or in U form or S form. A particularly convenient form, if a rectangular long and narrow room is available, is that of two necklaces of electrolysis cells of rectangular form with head ends facing each other and having independent bath circuits electrically in parallel but accommodated within one single rectangular "twin" furnace. In the embodiment shown in Figure 1 the single-line arrows 1 indicate the path of the current, and the double-line arrows 2 indicate the direction of flow, that is of the main circulation, of the electrolysis bath. A metal casing 3 contains a cell housing 4 of layers of refractory electrically and heat-insulating materials, and also contains the four "branches" 5′, 5″ and 6′, 6″ of groups of cells, which branches form by pairs, as stated, the two independent necklaces of cells, which, however, are assembled in one twin furnace.

The two longitudinal branches of each necklace have in common longitudinal intermediate walls 7 and 8 (Fig. 1), and the two necklaces have in common a transverse intermediate wall 9.

Figure 2:
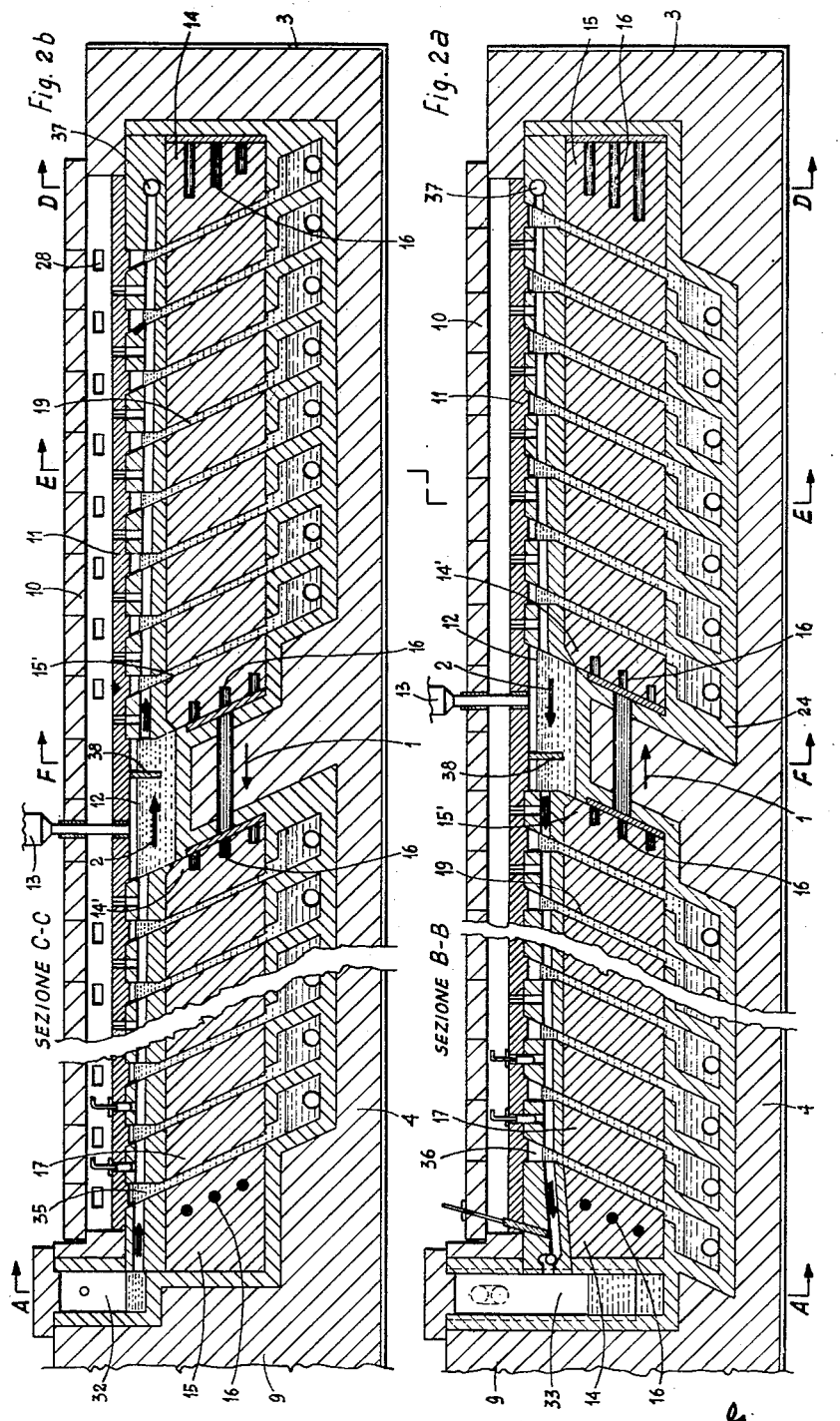
Figure 2a is a longitudinal section of the lower, right-hand necklace branch or cell groups of the furnace of Figure 1, the section being on the lines B—B of Figures 4, 5, 6 and 7.
Figure 2b is a longitudinal section of the upper, right-hand cell group shown in Figure 1, but provided with covers, the section being on the lines C—C of Figures 4, 5, 6 and 7.
Figure 3:
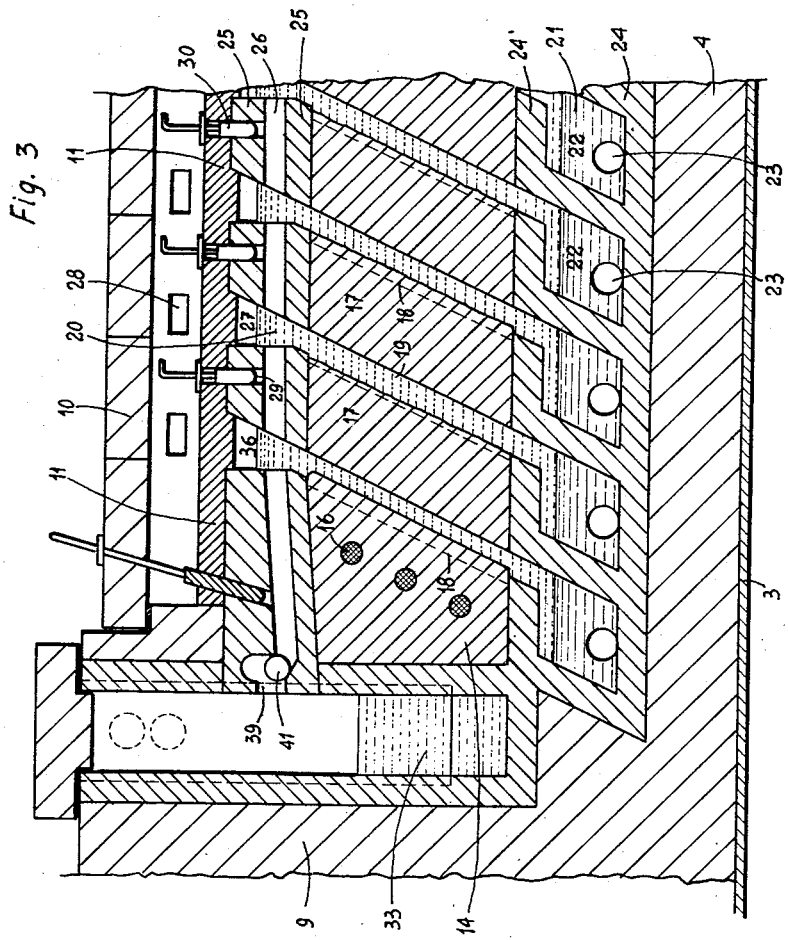

At the top of the cells, insulation is provided by various removable insulating layers, e.g. by external covers 10 and by underlying tiles 11 (Figs. 2 and 3). Each longitudinal branch of the furnace is formed by a certain number of elementary cells (Figures 2a, 2b and 3). It will be noted that individual outer covers 10 and individual tiles 11 provide access to each elementary cell. There may be intercalated intermediate chambers or feeding stations 12 for supply of alumina, with feeding devices 13.

Figure 4:
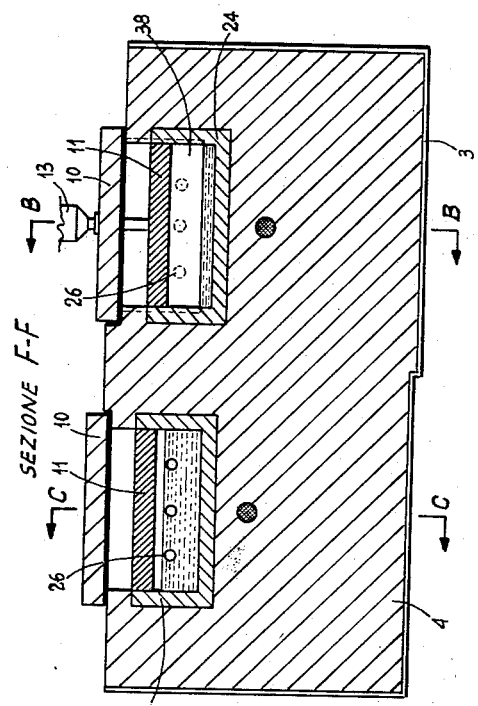
Figure 4 is a transverse section on the line E—E of Figures 2a and 2b.
Figure 5:
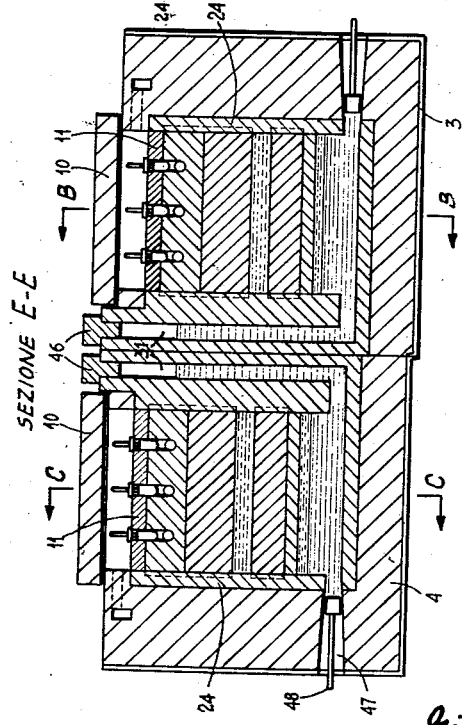
Figure 5 is a transverse section on the line F—F of Figures 2a and 2b.

The cells are formed as described in patent application No. 480,509, with terminal electrodes 14 (anodes) and 15 (cathodes) provided with metallic nipples (e.g. of iron) 16 (Figs. 2a and 2b) carrying the electric current and with intermediate bi-polar electrodes 17, anodic restoration layers 18 (Fig. 3), interelectrode gaps or electrolysis chambers (cells proper) 19 for the bath 20, and lower chambers 21 (Fig. 3) for collecting the metallic aluminium 22, each provided with a tapping outlet 23. The cell's electrodes and tapping chambers are enclosed by a coating 24 (Figs. 3 and 4) of material resistant to attack by the bath and by the metal, impermeable, electrically insulating and capable of withstanding the bath temperature. It is a distinctive and important feature of the cells of the furnace according to the present invention, that the electrode carbons are surmounted over their whole width by massive blocks 25 (Fig. 3) of a heat conductive, inert, electrically insulating, chemically resistant and impermeable material, which blocks constitute heads in which there are provided ducts 26 communicating from cell to cell, through which the liquid bath 20 circulates, and which constitute only a small by-pass for the electric current. Said ducts are at a level lower than that of gas collecting chambers 27 (Fig. 3) provided at the tops of the cells. The blocks 25 support the already mentioned removable tiles 11, which are conveniently of porous material allowing escape of the electrolysis gases, for the removal of which there may be provided also holes (not shown in the drawings) in said tiles. The gases are discharged through outlets 28. In blocks 25 there are provided vertical holes 29 with adjustable plugs 30 adapted to throttle the passageways of the ducts 26. Said plugs are represented in Figures 2a, 2b and 3 in lifted position. The tapping orifices 23 are in communication with a like number of pockets 31 (Figure 4) in the intermediate wall 7, 8. There are also provided external tapping orifices 47 with plugs 48 (Figure 4). The electrode carbons of the individual cells are inclined to an identical extent but preferably in reversed senses in the two branches of one and the same necklace of cells, as shown in Figures 2a and 2b.

One of the two heads of each necklace of cells is constituted essentially by two well-insulated and closed chambers, the chamber 32 having its bottom at a level higher than that of the other chamber 33 (Figure 6). The two chambers communicate with each other by a duct 34; these two terminal chambers in turn communicating respectively with the two contiguous cells, namely first cell 35 (Fig. 2b) and last cell 36 (Fig. 2a) of the electrolysis cells of the two branches of the necklace. Each branch comprises two batteries. The other end may be similarly arranged, or the two terminal chambers may be dispensed with if the levels of the two terminal electrolysis cells at this end are at the same height or nearly so, in which case said two terminal cells may be directly connected with each other, e.g. by a duct 37 shown in Figure 7.

In order not to complicate the drawing more than necessary, there are not shown therein the stable electric contacts (e.g., carbon strips) provided, as above-mentioned, between the graphite cathode and metal in the lower collecting chamber of each cell.

The materials to be employed, for the metallic shell or casing and for the refractory and heat-insulating layers of the cell housing or constituting the intermediate longitudinal walls, as well as for the external covers may be those already in use with conventional furnaces, such as porosite, powdered alumina, or refractory bricks of various types. The innermost layer in direct contact with the fused electrolytic bath and with the liquid metal produced is constituted, as stated above, by a material unattackable by and of little porosity with respect to the bath and metal. It is preferably a solid material previously fused or sintered at very high temperature, e.g., of corundum, or aluminium nitride, or of magnesium oxide which was previously electrofused. The material to be employed for the massive blocks 25 should be a poor electrical conductor but, analogous to carbon, a fair heat-conductor. Electrofused magnesium oxide (MgO) or corundum ($Al_2O_3$) have been successfully used. The tiles ("pads") 11 forming the ceiling of the cells may be, for example, of material containing magnesia and/or asbestos, that is, of material that is a good heat-insulator, capable of withstanding 1000° C. and preferably porous or fibrous and light. These tiles are proportioned so as to keep the gas layer over the bath at such temperatures as to avoid the possibility of solidification at the surface of the bath. The electrodes are of electrolytically attackable carbonaceous material, known per se, on the anodic side and of graphite on the cathodic side; the metallic nipples or studs are commonly of iron or steel.

Operation of the furnace according to the invention is as follows: The electrolytic current is passed through the circuit of the furnace in the following direction or sense; terminal anode bath/bi-polar electrode/bath/ . . . /bi-polar electrode/bath/terminal cathode. The current may enter through metallic conductors into any electrode carbon of the furnace, which will act only as a terminal anode, and leave the furnace from the immediately preceding electrode carbon, which will act exclusively as a terminal cathode, insulated from the terminal anode.

Both the entry and exit of the current is carried out by means of the metallic nipples which are distributed in the terminal electrode carbons and are preferably placed at an equal distance from the active electrode surface. This may be attained by arranging the terminal nipples in any convenient manner, e.g., in planes normal to said surface, as set forth by way of example in applicant's copending application No. 480,509 and as shown at the right of Figures 2a and 2b by arranging them parallel to said surface as shown at the left of Figures 2a and 2b, and in Figure 3.

The most convenient way to connect the furnace to the feed bars is to choose as a pair of terminal electrode carbons the two electrodes, one of which is an anode and the other a cathode, located at the head end of the necklace of cells, providing them with suitable metallic conductors. The electrical circuit is indicated in Figure 1.

Another convenient mode of connection consists in opening the necklace of cells, preferably at half distance between the ends of the furnace, by dividing one bi-polar electrode carbon adjacent the intermediate wall into an anodic carbon 14' and a cathodic carbon 15', and providing each with nipples as shown in the middle parts of Figures 2a and 2b. However, in such case, contrary to what is indicated in the drawings, the two electrodes are of course electrically insulated from each other.

As already mentioned, the electrolytic current passes through the bath circuit preferably in a direction opposed to that of the bath circulation, the current passing through the bi-polar carbons, and thus from one cell to another. Only a very small part of the current passes with the flow of the bath through the ducts 26.

In fact, in the furnace according to the present invention the bath circulates always inside the furnace, and through all the cells, until it returns to the starting cell from which it flows again through the whole circuit, and so on. The bath flow from each cell to the next may take place by way of conduits provided in the internal side walls of the furnace. Preferably flow is effected through the intermediate walls separating the individual cells through ducts 26 passing through the upper portions of said intermediate walls. The walls are constituted by the blocks 25 of suitable material (Figure 3).

The speed of the secondary circulation, or circulation of the bath in each cell, should also be as low as possible in order not to hinder the deposition of aluminium. On the other hand, the speed of main circulation of the bath should be sufficient to ensure an adequate feeding of alumina also to the cell most remote from the respective feeding station, unless separate feeding to each individual cell is resorted to.

The secondary bath circulation inside each cell should take place preferably downwards along the cathode and upwards along the anode.

The problems that arise in ensuring the circulation of the bath in the closed necklace type of furnaces are mainly due to the necessity of keeping the bath in any part of the circuit at a temperature which is higher than the critical temperature at which it loses its fluidity and which is equal or close to the optimum operating temperatures. They may be those at which electrolytic cells are operated at present. At that temperature the bath is very fluid, the quantity of flow to be ensured is surprisingly modest, hence circulation requires the overcoming of virtually negligible losses of pressure. Moreover, it is convenient to limit as much as possible and best to exclude the possibility of bypassing the current through the bath between the two terminal cells, which find themselves under the full voltage of the furnace.

In applicant's copending application No. 480,509 it is indicated that the upper portion of the transverse dividing wall between two contiguous cells is conveniently coated with a special material unattackable by the bath and unoxidizable. According to the present invention, instead of limiting the application of said material to a mere coating, the upper portion of the walls which is partly immersed in the bath, and inactive for electrolysis, may be conveniently constituted by a massive block of said material, resting upon the bi-polar carbon wall below and conveniently fixed to the side walls of the furnace as already stated, or by a carbon block entirely coated by such material.

In the upper inactive portion of the wall so formed there are provided the ducts 26, to ensure substantially parallel streamline flow of the bath. Through these ducts the bath flows in the required quantity if a very slight liquid head is ensured between the levels of two adjacent cells. It is also possible to give each of the two branches of the closed necklace type furnace a slight slope in the sense of the bath stream. The bath liquid leaving the ducts enters the individual cells in correspondence with the cathode surface. Only part of said bath stream descends along the cathode, while on the opposite anode surface there forms an ascending stream favoured by the development of the gases and by the temperature. This ascending stream joins the principal one that enters the exit channels.

In Figure 7 it will be noted that the channels open in the walls (horizontal blocks) at the top on the terminal electrodes of the two heading cells at the free end of the furnace are connected with each other by a duct 37 traversing the longitudinal wall separating the two branches of the necklace type furnace. At the opposed end of the necklace there is interposed the lifting device 32, 33 referred to hereinafter and shown in Figure 6.

For proper bath circulation through the above described ducts it is necessary that the temperature therein should diminish little as compared to that of the bath in the anodic zone, at least as long as the main circulation is to be kept up. It is required moreover that the bath levels in the different cells be established, freely, with the difference of level necessary to ensure the desired flow, and independently of the moderate variations of the average level which occur in the furnace during operation. This may be attained by closing the top 36 (Fig. 3) of the cell gaps by means of the pads or tiles 11 of insulating material above described. These tiles rest on the upper portions of the transverse walls between each two cells and preferably have such proportions as will keep the free bath surface at a temperature higher than the temperature of solidification of said bath, thus avoiding the possibility of crust formation. As stated, the issue of gas from the individual cells takes place through the porosity of the tiles and if needed through conveniently dimensioned holes. The tiles need be removed only when anodic restoration is undertaken. They may be covered or filled in part with alumina. At the end of the necklace type furnace other than that in which the above mentioned transverse duct is provided there are shown the means for creating the necessary liquid head to overcome the modest losses of pressure due to the bath circulation in the entire circuit. Also at this location it may be convenient to effect the feeding of alumina. By extending the side walls of the necklace type furnace it is possible to obtain, for instance at its head, two adjacent terminal chambers, e.g., as wide as the cells, with vertical or inclined walls, and as deep as needed to enable intermittent operation of the bath displacement or to accommodate therein the lifting device. The walls of these terminal chambers may be higher than those of the cells.

Heat-insulation should be such as to ensure that the temperature of the bath liquid contained in the said terminal chambers may be kept above the "critical" point as defined herein.

This is facilitated by the fact that the heat developed in the terminal cells is greater owing to the ohmic losses at the iron-carbon contact. Insulation becomes appreciably better if two necklaces of cells are provided, that is, two twin furnaces in one single symmetrical assembly in such a manner as to have the respective terminal chambers adjacent each other, in which arrangement it may also be convenient to group the stations for feeding alumina in the two heads instead of halfway along the cell assemblies as shown in Figures 1, 2a and 2b. Also a small additional heat source for the chambers and stations may be provided.

At least at one point of the circuit, preferably at one end of the necklace type furnace, it is necessary to lift the bath, optionally by hand actuated means, but preferably by pneumatic means, in such a way as to give the bath a sufficient liquid head to enable it to enter the furnace cell wherein the bath finds itself at the highest level. The return of the bath to the first cell of one branch of the furnace from the last cell of the other branch, which cells are side by side, may be carried out preferably with intermittent flow and intermittent contact, to avoid a current by-pass if, as already stated, between those two cells the voltage drop were at a maximum, that is, the total voltage drop of the furnace. It is possible advantageously to use lifting systems breaking the continuity of the bath. The passage of the bath through the chambers may conveniently take place for example as herein described with reference to Figure 6.

Each of the terminal chambers is put in communication with the adjacent cell by means of longitudinal ducts 39 (Fig. 3), 40 (Fig. 6). The bath will settle in the terminal chamber 33 adjacent the terminal anode at a level slightly lower than that of the adjacent cell, while in the other terminal chamber 32 the bath liquid has to be kept at a higher level (e.g., by some decimetres higher), by means of forced passage of the desired bath quantity. A convenient manner of ensuring the lifting of the bath liquid from one chamber to the other is as follows: The chamber 33 at lower level is in communication with the adjacent cell by means of one or more channels 39 provided with a rudimentary check valve (e.g., a ball check valve 41, Figure 3, of unattackable refractory material of specific gravity lower than that of the bath, the ball being for example of carbon coated with electrofused magnesium or aluminium oxide) serving to permit outflow of the bath only from the last cell to the low terminal chamber, and preventing reflux. The upper portion of each chamber is closed and is heat-insulated by an accurately fitting cover 10 (Fig. 6). Moreover, the pairs of terminal chambers intercommunicate with each other by means of at least one channel 34 (Fig. 6). The portion not occupied by the bath of the terminal chamber 33 at lower level is alternately put in communication by way of a conduit 44 (Fig. 6) with a tank (not shown in the drawing) containing an inert gas (e.g., electrolysis gas) kept at sufficient pressure to overcome the pressure drop between the two terminal chambers, which drop amounts to a few tenths of one atmosphere, and with a discharge. By adjusting the amount and frequency of pressure changes and duration of periods of overpressure and atmospheric pressure in chamber 33, the intermittent transfer of the desired bath quantity from said chamber into the chamber 32 is effected, even if the seal of the ball valve 41 acting as a reflux check is not perfect. The chamber 32 is provided with a vent 45.

At the other free end of the necklace type furnace (Figure 7) the passage of the bath from one terminal cell to the other takes place by way of at least one sufficiently long duct 37 traversing the partition wall 42 dividing the two branches of the furnace. The cross-section and length of the duct or ducts 37 are such as to limit the value of the electric current therethrough to a small percentage, e.g., 2–3%, of that passing through the furnace and between said terminal cells. Similar limitations are effective in the ducts 26 (Fig. 3) between any two adjacent cells in the same branch of the furnace. The alumina needed may be fed in continuously or intermittently, through one or more chambers or tanks or gaps interpolated in the necklace circuit, in such a way as to permit the flow of the bath therethrough. These feeding stations may be arranged, for example, at the ends of the necklace type furnace or in intermediate positions (12 and 13, Figures 2a and 2b). Anode effects are thereby avoided or much reduced in number. Hence there is no longer a need, as with conventional furnaces, for frequently breaking the bath crust, nor is it required that each elementary cell be fed directly with alumina as in applicant's copending application No. 480,509.

From the feeding station 12 supplied by feeder 13 the alumina passes into the main bath circuit, which in Figures 2a and 2b is made to flow under a partition 38 into an adjacent chamber and subsequently into the next adjacent electrolysis cell to the feeding station.

The tapping of the metal produced in the course of electrolysis is carried out in the necklace type furnace preferably through vertical pockets provided one for each cell in the internal refractory brickwork between the two branches of the furnace, as shown in Figure 4. Each cell is provided in its lower portion with an outlet passage 23 (Fig. 3) which after a short horizontal section is in communication with a vertical well or pocket 31 (Figs. 1 and 4) extending as far as the upper border of said cell. The liquid aluminum fills this lateral communicating passage and rises in the pocket 31 to a level that is some centimetres lower than the level in the cell of the bath liquid, which has a lower specific gravity than the metal. These tapping pockets, which are arranged in the internal longitudinal wall of th necklace type furnace, are at a sufficiently high temperature to prevent not only the solidification of the metal but also that of any bath liquid that might be present. The pockets 31 are closed at the top by small covers 46 to ensure heat-insulation.

The tapping of the metal is effected by means of an aspirating pipe immersed periodically into the metal from above, according to known procedures. There is provision also for the possibility of lateral tapping, e.g., in case of complete emptying of the furnace, by way of tapping outlets 47 provided with refractory plugs 48, as shown in Figure 4.

Anodic restoration is preferably carried out immediately after tapping from the respective cell and preferably after cutting off current previously. In applicant's already cited patent application Serial No. 480,509 and also in the applicant's copending application, Serial No. 551,679, filed December 7, 1955, there are described and claimed methods by which it is possible to carry out restoration of the anodic carbons (consumed by effect of electrolysis) either by lowering the bath level in the cell until the whole surface of the old anode is uncovered and then applying to said surface a plate or strips of restoring anodic material smeared with a binding layer, or alternatively, when operating with a full cell, for example, by merely leaning the new piece or pieces of anodic carbon against the old anode. In said patent applications there is also mentioned the circumstance that the increase of voltage drop occurring in the anode so restored can be reduced to a fraction of 1 volt.

From the point of view of operation, it is an important characteristic of the present invention that the following preferred procedure of tapping and anode restoration in the individual cells may be carried out at convenient times in the course of furnace operation, as indicated by the control means, such as instruments for measuring the levels, the current intensity and the voltages, thermocouples and so on, which for the sake of simplicity, and since they are not part of the invention proper, are not shown in the drawings. When in the cell shown in Figure 3, at least the greater part of the restorable or restoring thickness 18 of anodic layer is consumed, the current is preferably cut off and the external cover 10 is displaced to allow access to the subjacent tile 11 of the cell in question. This tile is then also lifted and removed. The cooling thus produced may suffice alone to solidify the bath in the adjacent ducts 26 thus interrupting the bath flow. Otherwise, and if there are provided vertical holes 29 (Fig. 3) with plugs 30, said interruption of circulation may be effected or assisted by lowering said plugs 30 to throttle the ducts. Thereafter the cover 46 (Figure 4) of the tapping pocket 31 in communication with that cell is removed, and by means of aspiration the metal produced and a certain excess are taken out, that is to say, as much metal as is needed to make the bath level descend in the cell below the level of the step of material 24′ (Fig. 3) on which the anode rests, particularly the restorable anode portion 18. Then the new restoring anode portion is introduced and applied against the consumed anodic face. Said restoring anode portion may be a compact plate of carbon, or it may be composed of a number of elements, convenieniently coated, on the surface that is to engage the basic anode carbon, with binding material, for example, containing hydrocarbon having a high melting point. Part of the liquid taken out is re-introduced through the tapping pocket, namely as much as is needed to make the bath level rise again in the cell whose anode had just been restored, to the height intermediate between the levels of the bath in the two contiguous cells. The porous tile 11 is then replaced and current is connected. Finally the cover 10 is also replaced after or before lifting of the plugs 30.

*Quantitative example*

Merely by way of example there is quantitatively described hereinafter one of the many possible embodiments of the present invention.

The furnace of this example comprises a single necklace type, that is to say, it is not of the twin type represented in Figure 1. It is composed altogether of 28 elementary cells subdivided into two branches, one of 12, which we shall call branch $a$ and the other of 16 cells, branch $b$. The two branches of the collapsed necklace are separated by one single longitudinal intermediate wall between them. The two terminal chambers for the lifting of the bath are interposed between the sixth and seventh cell (starting from the left) of branch $a$. The terminal anode of the sixth cell and the terminal cathode of the seventh cell of the branch $a$ are connected to feed bars for the supply of electric current. There are two stations for feeding alumina, one for each branch. That of the branch $a$ is interposed between the ninth and the tenth cells, that of the other branch $b$ of the necklace at five cells' distance from the opposite ends of the furnace. The inclination to the vertical of the electrode planes is $+30°$ for the cells of the branch $a$ and $-30°$ for those of the other branch. The smaller dimension of each cell gap, that is to say, the distance between two electrodic carbon blocks (which is usually smaller than 15 cm., being preferably comprised between 4 and 12 cm.) is maintained in the case in question between 4 and 8 cm. The thickness of the intermediate cross-partitions (usually less than 30 cm.) in the present example varies periodically from 22 to 26 cm. and the length of the channels in the massive blocks forming the heads of the bi-polar electrodes (usually more than 15 cm.) in the present example is about 18 cm. whence the by-passed current is less than 2%. The massive blocks and internal walls of the cells, chambers and pockets in contact with the bath and metal are lined with electrofused $Al_2O_3$. The permanent part of the intermediate bi-polar electrodes is of graphite. The restoring anode is of electrodic carbon. Its initial thickness is 4 cm. The volume of the bath attains periodically in each of said cell gaps a maximum value of about 50 litres without taking into account the volume of the hopper-shaped portion. The volume of the metal collecting chamber below should be higher than the aforesaid value in order that it may be possible to effect without inconvenience the operation of periodical integration (restoration) of the consumed anode in connection with tapping as hereinbefore described. In this example the lower chamber is ⅓ larger than the maximum volume attained by the bath in the electrolysis cell or gap. Each electrolytic gap (or element or cell) has a transverse horizontal dimension of 80 cm. and a depth (in the vertical sense) of active surface of about 60 cm. with a projection on the vertical plane of the active anodic and cathode surfaces of 4800 sq. cm. This projection "$s$" of course is smaller than the effective surfaces "$S$" ($s = S.\cos \alpha$ where $\alpha$ is the angle of inclination of the electrode surfaces to the vertical). When operating the furnace with 2500 amperes the electrodic density (referred to the projection on the usual vertical plane) is about 0.5 ampere/sq.cm. For the purpose of current passage, any two contiguous cells are in series. This furnace of, say, about 250 kw. and operating with voltages near to 100 volt yields an output of about half a ton of aluminum a day. If desired it is possible to attain one ton and more of aluminum daily, by increasing the dimensions and/or the number of elements (elementary cells) and/or the number of necklaces of cells (e.g., with a twin furnace). The circulation of the bath requires usually a flow varying preferably from 30 to 150 cc. a second; in the case of the example, from 50 to 100 cc./sec. The bath circulates in a direction opposed to the electrolytic current. The two feeding stations for feeding alumina introduce together from 11 to 13 grams of alumina a second, in the necklace type circuit, also according to the flow of the bath and depending on other operative factors. The tapping of the metal may be usually carried out every 4 days for each cell. In this example seven cells are to be tapped every day. Each tapped cell will yield a net output of 65–70 kg. of metal. The tapping is carried out preferably by aspirating the metal from the tapping pockets arranged in the hot intermediate wall of the furnace. The plug closing the top of the respective pocket is extracted and the tapping pipe is temporarily introduced from above for tapping by aspiration of the metal.

In the method according to the present invention and, therefore, particularly in the case of the example now given, the temperatures and the compositions of the cryolitic bath may be conventional. It is possible to operate for example with an alumina content in the bath of the order of say 5% in the cell most remote from the alumina feed station and with a content of the order of say 11% in the cell next to said feed station.

In the example considered, the speed in the ducts is 10–20 mm./sec. and that of the main circuit in the cells is of 1–2 mm./sec.

To feed alumina it is not necessary to open the covers of the individual cells. This operation becomes necessary only if anodic restoration in the individual cells is to be carried out. Anodic restoration in the example in question is practiced as hereinbefore described as an operation subsequent to a tapping operation, that is to say, after every period of 4 days either by mere anodic approachment as described in applicant's copending patent application No. 551,679 or as described in the first mentioned copending application No. 480,509.

However, it is possible to operate as follows: the covers 10 are opened, not only of the cell to be restored but if needed also those of the two contiguous cells, the heat-insulating pads (tiles) 11 are removed, the upper ducts 26 are closed by means of the plugs 30 between the adjacent cells, and current is cut off. When tapping is effected by aspiration of the metal from the respective tapping pocket until the bath descends to the level of the step 24' whereon the anode to be restored rests, which step thus remains uncovered. The plate or strips of restoring carbon (previously spread with binding material on the contact surface) is or are applied to the old anode and the excess metal extracted from the pocket, viz., the excess over the actual cell output is poured back into the pocket, so that the bath rises again from the lower metal collecting chamber into the cell and again substantially fills it. Then current is connected again, and the cell is recovered.

After a certain time the heat level is re-established automatically also in the connecting channels, so that the plugs 30 that had been lowered are no longer locked by solidified bath, and can be easily lifted and secured in the raised position. It is desirable that the cross-section and mean length of the communication ducts 26 between two contiguous cells be such as to ensure the required bath flow (e.g., 50 to 100 cc./sec.) without having to resort either to substantial differences of level or to excessive flow speeds. It is convenient to keep the speed of the main circuit in the channels lower than 50 mm./sec. In the secondary circuits between the anode and cathode of one individual cell it is difficult to measure the relative speeds which are probably in all or in part independent of the speeds of the main circuit. The bath liquid head necessary to ensure the circulation through the whole series of cells is not high, having regard to the considerable fluidity of fluorinated baths. The order of magnitude of said liquid head will not be higher than some decimetres for the whole furnace. Of course, this simplifies the problem of lifting the bath intermittently again from the sixth cell (the cell at lowest level) up to the seventh cell (the cell at highest level) of the branch "a."

The travel of the electric current is in the sense contrary to the main circulation of the bath. In fact, the latter moves away from the cathode surface to arrive at the anode surface of the subsequent bi-polar electrode. The modest differences of level existing in the necklace type furnace permit easy changeover, from the furnace operated as two separate multi-cell furnaces with all the plugs 30 of the inter-communicating ducts 26 lowered and with the lifting device at a standstill, to the operation of the furnace as a closed necklace of cells, and vice versa. In fact when the individual cells have attained the normal temperature of full operation, the plugs can be easily lifted and the lifting device can be started, whereupon there commences the main circulation of the bath through all the individual cells of the furnace. The unit consumption of materials (carbons and fluorine compounds), as well as labour required, are lower or at any rate not higher than those of industrial furnaces with horizontal layers and adjustable electrode spacings as used hitherto. The unit consumption of energy is as much as by 30% to 50% lower. Also the first cost (of construction and of installation) is considerably lower for equal production.

The furnace constructed according to the present invention also presents significant advantages over the multi-cell furnace of patent application No. 480,509, such as, for example, a better possibility of insulating effectively the top portion and the internal sides of the furnace and the consequent reduction of the part of electric power that has to be transformed into ohmic heat. It also has a higher output capacity, employs less labor, is simplified in respect to anodic restoration, permits tapping without extraction of bath and without contact with the bath, and provides improved heat-equalization of the bath between one cell and the other. There is a lesser tendency to form crusts, and there are present the possibility of employment of less pure aluminium oxides and the production of high-grade metal by means of the selection or classification. These advantages are readily obtainable with the circulation of the bath through cells in series with individual tapping according to the present invention.

The furnace according to the present invention may be usefully employed for other processes of electrolysis of fused salts, its field of application not being limited to the production of metallic aluminium from its oxide. The aluminium compound employed (other than $Al_2O_3$), the electrolysis baths (other than prevailingly fluorides), and the product (other than metallic Al), may all be varied.

It is to be noted that the sake of clarity there is in the drawings no representation of any bath in the ducts 26, 34 and 37.

It is to be understood that the mode of construction of furnaces according to the invention and method of operation thereof may be modified or varied from those hereinbefore described with reference to the accompanying drawings, within the scope of the invention as defined by the appended claims.

I claim:

1. In a method of producing aluminum by electrolysis of aluminum oxide dissolved in a bath of fused salts in which an electric current is passed in series longitudinally through a solid anodic surface, an intervening electrolysis gap of fused bath, through an intermediate solid bipolar electrode providing opposite anodic and cathodic surfaces, a second electrolysis gap of said bath, another of said bipolar electrodes, a third electrolysis gap, and through a cathodic surface, the anodic surfaces being renewable carbonaceous surfaces consumable in the electrolysis, the improvements characterized in that the aluminum is collected below each electrolysis gap, being maintained above the solidification temperature by the heat of the electrolysis, and in that said bath is caused to circulate from cell to cell, that is, from electrolysis gap to electrolysis gap, during the electrolysis, within the furnace, said circulation being in at least one closed circuit of cells completely internal to said furnace, a feed containing aluminum oxide being fed at at least one location within said furnace in said circuit, the aluminum produced in each electrolysis gap being individually collected below each gap and being tapped individually and independently from each electrolysis gap, anodic restoration being effected individually for each cell, and said circulation being maintained by gravity flow and by lifting the bath at a location within said furnace.

2. In a method of producing aluminum by electrolysis of aluminum oxide dissolved in a bath of fused salts in which an electric current is passed in series longitudinally through a solid anodic surface, an intervening electrolysis gap of fused bath, through an intermediate solid bipolar electrode providing opposite anodic and cathodic surfaces, a second electrolysis gap of said bath, another of said bipolar electrodes, a third electrolysis gap, and through a cathodic surface, the anodic surfaces being renewable carbonaceous surfaces consumable in the electrolysis, the aluminum being collected below, the improvement characterized in that said bath is caused to circulate from cell to cell, that is, from electrolysis gap to electrolysis gap, during the electrolysis, within the furnace, at least in one closed circuit completely internal to said furnace, a feed containing aluminum oxide being fed at at least one location in said circuit, the aluminum produced being tapped individually and independently from each electrolysis gap, anodic restoration being effected individually for each cell, and said circulation being maintained by gravity flow and by lifting the bath at a location within said furnace, the anodic restoration in each individual cell being effected by uncovering the bath in the region of said cell, thereby to throttle, by cooling, passage of the bath liquid to and from said cell, cutting off the electrolysis current, tapping by taking out from the pocket of aluminum of said cell a volume of aluminum in excess over the quantity actually produced and of such magnitude as to lower the bath level in the cell until the electrolysis space between the electrodes is completely emptied, then proceeding with restoration of the consumed anode, then pouring aluminum back into the tapping pocket, so as to cause the bath level to rise in the cell until the interelectrode space is again filled, and again supplying electric current, and covering the uncovered region so as to enable the temperature to rise again, thereby automatically to unlock and restore the main bath circulation by gravity through said cell.

3. In a method of producing aluminum by electrolysis of aluminum oxide dissolved in a bath of fused salts in which an electric current is passed in series longitudinally through a solid anodic surface, an intervening electrolysis gap of fused bath, through an intermediate solid bipolar electrode providing opposite anodic and cathodic surfaces, a second electrolysis gap of said bath, another of said bipolar electrodes, a third electrolysis gap, and through a cathodic surface, the anodic surfaces being renewable carbonaceous surfaces consumable in the electrolysis, the aluminum being collected below, the improvement characterized in that said bath is caused to circulate from cell to cell, that is, from electrolysis gap to electrolysis gap, during the electrolysis, within the furnace, at least in one closed circuit completely internal to said furnace, a feed containing aluminum oxide being fed at at least one location in said circuit, the aluminum produced being tapped individually and independently from each electrolysis gap, anodic restoration being effected individually for each cell, and said circulation being maintained by gravity flow and by lifting the bath at a location within said furnace, the anodic restoration in each individual cell being effected by uncovering the bath in the region of said cell, thereby to throttle, by cooling, passage of the bath liquid to and from said cell, cutting off the electrolysis current, tapping by taking out from the pocket of aluminum of said cell a volume of aluminum in excess over the quantity actually produced and of such magnitude as to lower the bath level in the cell until the electrolysis space between the electrodes is completely emptied, then proceeding with restoration of the consumed anode, then pouring aluminum back into the tapping pocket, so as to cause the bath level to rise in the cell until the interelectrode space is again filled, and again supplying electric current, and covering the uncovered region so as to enable the temperature to rise again, thereby automatically to unlock and restore the main bath circulation by gravity through said cell, said restoration being carried out by applying, against the old anode, while in situ in the furnace, means forming a plate of anodic restoring material, after previous spreading of the application surface thereof with a cokable binder containing hydrocarbons.

4. In a method of producing aluminum by electrolysis of aluminum oxide dissolved in a bath of fused salts in which an electric current is passed in series longitudinally through a solid anodic surface, an intervening electrolysis gap of fused bath, through an intermediate solid bipolar electrode providing opposite anodic and cathodic surfaces, a second electrolysis gap of said bath, another of said bipolar electrodes, a third electrolysis gap, and through a cathodic surface, the anodic surfaces being renewable carbonaceous surfaces consumable in the electrolysis, the aluminum being collected below, the improvement characterized in that said bath is caused to circulate from cell to cell, that is, from electrolysis gap to electrolysis gap, during the electrolysis, within the furnace, at least in one closed circuit completely internal to said furnace, a feed containing aluminum oxide being fed at at least one location in said circuit, the aluminum produced being tapped individually and independently from each electrolysis gap, anodic restoration being effected individually for each cell, and said circulation being maintained by gravity flow and by lifting the bath at a location within said furnace, the anodic restoration in each individual cell being effected by uncovering the bath in the region of said cell, thereby to throttle, by cooling, passage of the bath liquid to and from said cell and tapping a volume of aluminum metal collected from said cell, then proceeding with restoration of the consumed anode by leaning against the old anode while in situ in the furnace, a plate constituted by at least one element of anodic restoring material, which material is introduced into the cell without evacuating the bath, recovering the uncovered region so as to enable the temperature to rise again thereby automatically to unlock and restore the main bath circulation through said cell.

5. In a method of producing aluminum by electrolysis of aluminum oxide dissolved in a bath of fused salts in which an electric current is passed in series longitudinally through a solid anodic surface, an intervening electrolysis gap of fused bath, through an intermediate solid bipolar electrode providing opposite anodic and cathodic surfaces, a second electrolysis gap of said bath, another of said bipolar electrodes, a third electrolysis gap, and through a cathodic surface, the anodic surfaces being renewable carbonaceous surfaces consumable in the electrolysis, the improvements characterized in that the aluminum is collected below each electrolysis gap, being maintained above the solidification temperature by the heat of the electrolysis, and in that said bath is caused to circulate from cell to cell, that is, from electrolysis gap to electrolysis gap, during the electrolysis, within the furnace, said circulation being in at least one closed circuit of cells completely internal to said furnace, a feed containing aluminum oxide being fed at at least one location within said furnace in said circuit, the aluminum produced in each electrolysis gap being individually collected below each gap and being tapped individually and independently from each electrolysis gap, anodic restoration being effected individually for each cell, and said circulation being maintained by gravity flow and by lifting the bath at a location within said furnace, the circulation of the bath in a closed circuit through the cells in series being caused by effecting, at substantially regular time intervals, lifting of bath liquid from a cell with low bath level to a contiguous cell with high bath level, said circulation being the main circulation, there also being secondary circulation, by effect of the electrolysis, descending along the cathode and ascending along the anode of each individual cell.

6. In a method of producing aluminum by electrolysis of aluminum oxide dissolved in a bath of fused salt in which an electric current is passed in series longitudinally through a solid anodic surface, an intervening electrolysis gap of fused bath, through an intermediate solid bipolar electrode providing opposite anodic and cathodic surfaces, a second electrolysis gap of said bath, another of said bipolar electrodes, a third electrolysis gap, and through a cathodic surface, the anodic surfaces being renewable carbonaceous surfaces consumable in the electrolysis, the improvements characterized in that the aluminum is collected below each electrolysis gap, being maintained above the solidification temperature by the heat of the electrolysis, and in that said bath is caused to circulate from cell to cell, that is, from electrolysis gap to electrolysis gap, during the electrolysis, within the furnace, said circulation being in at least one closed circuit of cells completely internal to said furnace, a feed containing aluminum oxide being fed at at least one location within said furnace in said circuit, the aluminum produced in each electrolysis gap being individually collected below each gap and being tapped individually and independently from each electrolysis gap, anodic restoration being effected individually for each cell, and said circulation being maintained by gravity flow and by lifting the bath at a location within said furnace, the aluminum produced in the electrolysis gaps being individually withdrawn from each gap to respective individual zones each of which is in individual communication with the aluminum collected below the respective gap, the said individual zones being maintained by the heat of electrolysis at a temperature higher than the solidification temperature of the liquids present in the electrolysis cell, the aluminum being periodically tapped from said zones.

7. A multi-cell furnace apparatus for production of aluminum by electrolysis of alumina in a fused bath, comprising a refractory electrically insulating furnace wall structure, first means within said structure providing transverse electrodes comprising a terminal cathode, a terminal anode, and at least one bipolar cathode-anode electrode disposed between the terminal cathode and anode, the walls of the transverse electrodes facing the bath extending upwardly, pairs of opposed anodic and cathodic surfaces of said walls forming a cell, the anodic surfaces being of renewable carbonaceous material electrochemically consumed in the electrolysis, electric connections for passing current longitudinally and serially from the terminal anode through the intervening fused bath, through the opposite cathode-anode faces of the bipolar electrode, and eventually after passing through intervening bath, to the terminal cathode, the furnace apparatus providing restricted ducts enclosed therein through which the fused bath flows from the upper part of one cell to another but which constitute at most a by-pass for no more than a minor fraction of the electric current, said furnace structure providing a lower wall and electrically non-conductive transverse partitioning means extending from the bipolar electrode to the lower wall to provide segregated bottom compartments for reception of molten aluminum from individual cathodic surfaces, the restricted ducts being in the upper region of the furnace, passageways enclosed within said structure communicating with opposite ends of said first means, the fused bath flowing through said enclosed passageways and said restricted ducts in a circuit which is wholly enclosed within said furnace wall structure, means for introducing replenishing alumina from without said furnace into said circuit, and means for tapping aluminum separately from each bottom compartment.

8. A multi-cell furnace for production of aluminum by electrolysis of alumina in a fused bath, comprising a refractory electrically insulating furnace wall structure, first means within said structure providing transverse electrodes comprising a stationary terminal cathode, a stationary terminal anode, and at least one stationary bipolar cathode-anode electrode disposed between the terminal cathode and anode, the walls of the transverse electrodes facing the bath extending upwardly at an inclination to the vertical, pairs of opposed anodic and cathodic surfaces of said walls forming a cell, the anodic surfaces being of renewable carbonaceous material electrochemically consumed in the electrolysis, electric connections for passing current longitudinally and serially from the terminal anode through the intervening fused bath, through the opposite cathode-anode surfaces of the bipolar electrode, and eventually, after passing through intervening fused bath, to the terminal cathode, the inclined anodic surfaces facing downwardly, electrically insulative elements surmounting each of the bipolar electrodes, the elements providing restricted ducts through which the fused bath flows between adjacent cells but which constitute at most a by-pass for no more than a minor fraction of the electric current, said furnace structure providing a bottom wall and electrically non-conductive transverse partitioning means extending from the bipolar electrode to the bottom wall to provide segregated bottom compartments for reception of molten aluminum from individual cathodic surfaces, passageways enclosed within said structure communicating with opposite ends of said first means, the fused bath flowing through said enclosed passageways and said restricted ducts in a circuit wholly enclosed within said furnace wall structure, means for introducing replenishing alumina from without said furnace into said circuit, and means for tapping aluminum separately from each bottom compartment.

9. A multi-cell furnace apparatus for production of aluminum by electrolysis of alumina in a fused bath, comprising a refractory electrically insulating furnace wall structure, first means within said structure providing transverse electrodes comprising a terminal cathode, a terminal anode, and at least one bipolar cathode-anode electrode disposed between the terminal cathode and anode, the walls of the electrodes facing the bath extending upwardly, pairs of opposed anodic and cathodic surfaces of said walls forming a cell, the anodic surfaces being of renewable carbonaceous material electrochemically consumed in the electrolysis, renewal means forming a plate of carbonaceous material in position at the anodic face of the bipolar electrode and at the anodic face of the terminal anode, said means comprising said anodic surfaces, electric connections for passing current longitudinally and serially from the terminal anode through the intervening fused bath, through the opposite cathode-anode faces of the bipolar electrode, and eventually, after passing through intervening bath, to the terminal cathode, the furnace apparatus providing restricted ducts enclosed therein through which the fused bath flows from the upper part of one cell to another but which constitute at most a by-pass for no more than a minor fraction of the electric current, said furnace structure providing a lower wall and electrically non-conductive transverse partitioning means extending from the bipolar electrode to the lower wall to provide segregated bottom compartments for reception of molten aluminum from individual cathodic surfaces, the restricted ducts being in the upper region of the furnace, passageways enclosed within said structure communicating with opposite ends of said first means, the fused bath flowing through said enclosed passageways and said restricted ducts in a circuit which is wholly enclosed within said furnace wall structure, means for introducing replenishing alumina from without said furnace into said circuit, and means for tapping aluminum separately from each bottom compartment.

10. A multi-cell furnace for production of aluminum by electrolysis of alumina in a fused bath, comprising a refractory electrically insulating furnace wall structure, first means within said structure providing transverse electrodes comprising a stationary terminal cathode, a stationary terminal anode, and at least one stationary bipolar cathode-anode electrode disposed between the terminal cathode and anode, the walls of the electrodes facing the bath extending upwardly at an inclination to the vertical, pairs of opposed anodic and cathodic surfaces of said walls forming a cell, the inclined anodic surfaces facing downwardly, the cathodic surfaces facing upwardly, the anodic surfaces being of renewable carbonaceous material electro-chemically consumed in the electrolysis, renewal means forming a plate of carbonaceous material in position at the anodic face of the bipolar electrode and at the anodic face of the terminal anode, said means comprising said anodic surfaces, electric connections for passing current longitudinally and serially from the terminal anode through the intervening fused bath, through the opposite cathode-anode surfaces of the bipolar electrode, and eventually, after passing through intervening fused bath, to the terminal cathode, the inclined anodic surfaces facing downwardly, electrically insulative elements surmounting each of the bipolar electrodes, the elements providing restricted ducts through which the fused bath flows between adjacent cells but which constitute at most a by-pass for no more than a minor fraction of electric current, said furnace structure providing a bottom wall and electrically non-conductive transverse partitioning means extending from the bipolar electrode to the bottom wall to provide segregated bottom compartments for reception of molten aluminum from individual cathodic surfaces, passageways enclosed within said structure communicating with opposite ends of said first means, the fused bath flowing through said enclosed passageways and said restricted ducts in a circuit wholly enclosed within said furnace wall structure, means for introducing replenishing alumina from without said furnace into said circuit, and means for tapping aluminum separately from each bottom compartment.

11. The apparatus defined in claim 9 in which the cathodic and anodic surfaces extend upwardly at an inclination to the vertical, the inclined anodic surfaces facing downwardly, the cathodic surfaces facing upwardly.

12. A multi-cell furnace apparatus for production of aluminum by electrolysis of alumina in a fused bath, comprising a refractory electrically insulating furnace wall structure, at least two branches longitudinally disposed within said structure, the structure including an intervening wall, the branches being along opposite sides of the intervening wall, each branch comprising means providing transverse electrodes comprising a stationary terminal cathode, a stationary terminal anode, and at least one stationary bipolar cathode-anode electrode disposed between the terminal cathode and anode, the walls of the transverse electrodes facing the bath extending upwardly, pairs of opposed anodic and cathodic surfaces of said walls forming a cell, the anodic surfaces being of renewable carbonaceous material electrochemically consumed in the electrolysis, electric connections for passing current longitudinally and serially from the terminal anode through the intervening fused bath, through the opposite cathode-anode faces of the bipolar electrode, and eventually, after passing through intervening bath, to the terminal cathode, the furnace apparatus providing restricted ducts enclosed therein through which the fused bath flows from the upper part of the one cell to another but which constitute at most a bypass for no more than a minor fraction of the electric current, the restricted ducts being in the upper region of the furnace, said furnace having a lower wall and electrically non-conductive transverse partitioning means extending from the bipolar electrode to the lower wall to provide segregated bottom compartments for reception of molten aluminum from individual cells, passageways enclosed within said structure connecting said branches, the fused bath flowing through said enclosed passageways and said restricted ducts in a circuit which is enclosed within said furnace wall structure, means for introducing replenishing alumina from without said furnace into said circuit, individual off-take wells individually connected to the bottom compartments for separate tapping of aluminum from each cell, said wells being situated in said intervening wall.

13. A multi-cell furnace for production of aluminum by electrolysis of alumina in a fused bath, comprising a refractory electrically insulating furnace wall structure, at least two branches longitudinally disposed within said structure, the structure including an intervening longitudinal wall, the branches being disposed along opposite sides of the intervening wall, each branch comprising at least one group of cells having transverse electrodes comprising a stationary terminal cathode, a stationary terminal anode, and at least one stationary bipolar cathode-anode electrode disposed between the terminal cathode and anode, the walls of the transverse electrodes facing the bath extending upwardly, pairs of opposed anodic and cathodic surfaces of said walls forming a cell, renewal plates of carbonaceous material in position at the anodic face of the bipolar electrode and at the anodic face of the terminal anode, said plates providing anodic surfaces which are electrochemically consumed in the electrolysis, electric connections for passing current serially from the terminal anode through the intervening fused bath, through the opposite cathode-anode faces of the bipolar electrode, and eventually, after passing through intervening bath, to the terminal cathode, electrically insulative elements surmounting the transverse electrodes, the elements providing restricted ducts through which the fused bath flows, said furnace structure providing a lower wall and electrically non-conductive transverse partitioning means extending from the bipolar electrode to the lower wall to provide segregated bottom compartments for the reception of molten aluminum from individual cells, passageways enclosed within said structure connecting said branches, the fused bath flowing through said enclosed passageways and said restricted ducts in a circuit which is wholly enclosed within said furnace wall structure, means for introducing replenishing alumina from without said furnace into said circuit, off-take wells individually connected to the bottom compartments for separate tapping of aluminum from each cell, said wells being situated in said intervening wall.

14. The apparatus of claim 7 in which said first means, providing transverse electrodes, has a series of said bipolar electrodes, the level of said restricted ducts decreasing generally in the direction of flow of fused bath in said circuit, and means in said insulated wall structure for receiving the fused bath flowing from one end of the first means and for returning it to the other end of the first means.

15. The apparatus defined in claim 8 in which the restricted ducts are provided with throttling means between the cells.

16. The apparatus of claim 7 in which said first means, providing transverse electrodes, has a series of said bipolar electrodes, the level of said restricted ducts decreasing generally in the direction of flow of fused bath in said circuit, and means in said insulated wall structure for receiving the fused bath flowing from one end of the first means and for returning it to the other end of the first means, the current flowing from anode to cathode in the direction opposite the said flow of fused bath.

17. The apparatus defined in claim 13 in which each of the groups of cells has a series of the bipolar electrodes, the level of the restricted ducts decreasing in the direction of the flow of fused bath in said circuit, a chamber in said furnace wall structure for receiving fused bath liquid from one of said branches, a second chamber in said insulated wall structure for returning fused bath liquid to the other of the said branches, the bottom of the second chamber being at a higher level than the first chamber, and means to lift the liquid from the first to the second chamber.

18. A multi-cell furnace apparatus for production of aluminum by electrolysis of alumina in a fused bath, comprising a refractory electrically insulating furnace wall structure, a closed chain of cells, the chain comprising at least two branches longitudinally disposed within said structure, the structure including an intervening longitudinal wall, the branches being at opposite sides of the intervening wall, each branch comprising at least two groups of electrolysis cells each group having transverse electrodes comprising a stationary terminal cathode, a stationary terminal anode, and a series of stationary bipolar cathode-anode electrodes disposed between the terminal cathode and anode, the walls of the transverse electrodes facing the bath extending upwardly, pairs of opposed anodic and cathodic surfaces of said walls forming a cell, renewal plates of carbonaceous material in position at the anodic face of the bipolar electrode and at the anodic face of the terminal anode, said plates providing anodic surfaces which are electrochemically consumed in the electrolysis, electric connections for passing current longitudinally and serially from the terminal anode through the intervening fused bath, through the opposite cathode-anode faces of the bipolar electrode, and eventually, after passing through intervening bath, to the terminal cathode, the furnace apparatus providing restricted ducts through which the fused bath flows from one cell to the next, said furnace structure providing a lower wall and electrically non-conductive transverse partitioning means extending from the bipolar electrode to the lower wall to provide segregated bottom compartments for reception of molten aluminum from individual cells, passageways enclosed within said structure and connecting ends of said branches, the fused bath circulating through said enclosed passageways and said restricted ducts in a circuit through both branches which circuit is enclosed within said furnace wall structure, receiving chambers for replenishing alumina situated between the groups of cells of each branch and enclosed within said furnace wall structure and connected in said circuit, means for introducing replenishing alumina from without said furnace into said chambers, off-take wells individually connected to the bottom compartments for separate tapping of aluminum from each cell, said wells being situated in said intervening wall.

19. A multi-cell furnace apparatus for production of aluminum by electrolysis of alumina in a fused bath, comprising a refractory electrically insulating furnace wall structure, a closed chain of cells, the chain comprising at least two branches longitudinally disposed within said structure, the structure including an intervening longitudinal wall, the branches being at opposite sides of the intervening wall, each branch comprising at least two groups of cells each group having transverse electrodes comprising a stationary terminal cathode, a stationary terminal anode, and a series of stationary bipolar cathode-anode electrodes disposed between the terminal cathode and anode, the walls of the transverse electrodes facing the bath extending upwardly, pairs of opposed anodic and cathodic surfaces of said walls forming a cell, renewal plates of carbonaceous material in position at the anodic face of the bipolar electrode and at the anodic face of the terminal anode, said plates providing anodic surfaces which are electrochemically consumed in the electrolysis, electric connections for passing current longitudinally and serially from the terminal anode through the intervening fused bath, through the opposite cathode-anode faces of the bipolar electrode, and eventually, after passing through intervening bath, to the terminal cathode, the furnace apparatus providing restricted ducts through which the fused bath flows from one cell to the next, said furnace structure providing a lower wall and electrically non-conductive transverse partitioning means extending from the bipolar electrode to the lower wall to provide segregated bottom compartments for reception of molten aluminum from individual cells, passageways enclosed within said structure and connecting ends of said branches, the fused bath circulating through said enclosed passageways and said restricted ducts in a circuit through both branches which circuit is enclosed within said furnace wall structure, receiving chambers for replenishing alumina situated between the groups of cells of each branch and enclosed within said furnace wall structure and connected in said circuit, means for introducing replenishing alumina from without said furnace into said chambers, off-take wells individually connected to the bottom compartments for separate tapping of aluminum from each cell, said wells being situated in said intervening wall, the height of the restricted ducts decreasing in the direction of the flow of fused bath in said circuit, a chamber in said furnace wall structure for receiving fused bath liquid from one of said branches, a second chamber in said insulated wall structure for returning fused bath liquid to the other of the said branches, the bottom of the second chamber being at a higher level than the first chamber, and means to lift the liquid from the first to the second chamber.

20. A multi-cell furnace apparatus for production of aluminum by electrolysis of alumina in a fused bath, comprising a refractory electrically insulating furnace wall structure, a closed chain of cells, the chain comprising at least two parallel branches longitudinally disposed within said structure, the structure including an intervening wall, the branches being along opposite sides of the intervening wall, each branch comprising means providing transverse electrodes comprising a terminal cathode, a terminal anode, and a series of bipolar cathode-anode electrodes disposed between the terminal cathode and anode, the cathodic and anodic surfaces extending upwardly at an angle to the vertical, the major component of direction being vertical, opposed transverse cathodic and anodic surfaces extending, over their area, in general parallelism, pairs of the opposed surfaces forming a cell, the cathodic surface facing upwardly, the anodic surfaces facing downwardly and being of renewable carbonaceous material electrochemically consumed in the electrolysis, said anodic surfaces constituting renewal plates of carbonaceous material in position at the anodic face of the bipolar electrode and at the anodic face of the terminal anode, said bipolar electrode and said terminal anode comprising fixed blocks, electric connections for passing current serially from the terminal anode through the intervening fused bath, through the opposite cathode-anode faces of the bipolar electrode, and eventually, after passing through intervening bath, to the terminal cathode, electrically insulative elements surmounting each of the bipolar electrodes, the furnace apparatus providing restricted ducts through which the fused bath flows, said furnace structure providing a lower wall and electrically non-conductive transverse partitioning means extending from the bipolar electrodes to the bottom wall to provide segregated bottom compartments for reception of molten aluminum from individual cells, the restricted ducts being in the upper part of the cell and above the normal level of the collected aluminum, the fused bath flowing through said ducts from one cell to the next, the flow of the fused bath being by gravity from the cathode to the anode, passageways enclosed within said structure connecting said branches, the fused bath flowing through said enclosed passageways and said restricted ducts in a circuit through both branches, which circuit is enclosed within said furnace wall structure, off-take wells individually connected to the bottom compartments for separate tapping of aluminum from each cell, said wells being situated in said intervening wall, 21. A multi-cell furnace for production of aluminum by electrolysis of alumina in a fused bath, comprising a refractory electrically insulating furnace wall structure, a closed chain of cells, the chain comprising at least two parallel branches longitudinally disposed within said structure, the structure including an intervening wall, the branches being along opposite sides of the intervening wall, each branch comprising means providing transverse electrodes comprising a terminal cathode, a terminal anode, and a series of bipolar cathode-anode electrodes disposed between the terminal cathode and anode, the walls of the transverse electrodes facing the bath extending upwardly at an angle to the vertical, pairs of opposed anodic and cathodic surfaces of said walls forming a cell, the anodic surfaces facing downwardly and being of renewable carbonaceous material electrochemically consumed in the electrolysis, the cathodic surfaces facing upwardly, said anodic surfaces constituting renewal plates of carbonaceous material in position at the anodic face of the bipolar electrode and at the anodic face of the terminal anode, said bipolar electrode and said terminal anode comprising fixed blocks, electric connections for passing current serially from the terminal anode through the intervening fused bath, through the opposite cathode-anode faces of the bipolar electrode, and eventually, after passing through intervening bath, to the terminal cathode, electrically insulative elements surmounting each of the bipolar electrodes, the furnace having restricted ducts through which the fused bath flows but which constitute at most, a by-pass for no more than a minor fraction of the electric current, said furnace structure providing a lower wall and electrically non-conductive transverse partitioning means extending from the bipolar electrodes to the bottom wall to provide segregated bottom compartments for reception of molten aluminum from individual cells, the restricted ducts being in the upper part of the cell and above the normal level of the collected aluminum, the fused bath flowing through said ducts from one cell to the next, the flow of the fused bath being by gravity from the cathode to the anode, passageways enclosed within said structure connecting said branches, the fused bath flowing through said enclosed passageways and said restricted ducts in a circuit through both branches, which circuit is enclosed within said furnace wall structure, off-take wells individually connected to the bottom compartments for separate tapping of aluminum from each cell, said wells being situated in said intervening wall, a chamber in said furnace wall structure for receiving fused liquid from one of said branches, a second chamber in said insulated wall structure for returning fused bath liquid to the other of the said branches, the bottom of the second chamber being at a higher level than the first chamber, and means to lift the liquid from the first to the second chamber.

22. The furnace defined in claim 18, the cells being covered by a roof of removable tiles of heat-insulating refractory material, the roof having passages for gas formed in the electrolyses, the cells further having individually removable heat-insulating outer covers spaced above the tiles to form a gas outlet chamber.

23. The apparatus defined in claim 22, and individual throttling means for said restricted ducts between adjacent cells and having manipulating means therefor passing through said roof of tiles, the manipulating means being accessible upon removing the said outer covers.

24. In a method for producing aluminum by electrolysis of alumina dissolved in a fused bath in which an electric current is passed in series longitudinally through a fixed solid anodic surface, an intervening electrolysis gap of fused bath, through an intermediate fixed solid bipolar electrode providing opposite anodic and cathodic surfaces, a second electrolysis gap of said bath, another of said bipolar electrodes, a third electrolysis gap, and through a fixed cathodic surface, the anodic surfaces being renewable carbonaceous surfaces consumable in the electrolysis, the improvement comprising collecting and tapping the resulting aluminum, flowing downwardly along the cathodic surfaces, from each of said electrolysis gaps separately, circulating the fused bath, in a closed circuit within the furnace, by removing the fused bath from one electrolysis gap to the next, the removal being at points upwardly removed from the normal level of the collected aluminum, and feeding aluminum oxide at a location in said circuit, the circulation of said bath being obtained by passing overflow of the said bath from one electrolysis gap to the next, by gravity, the overflow being restricted in amount to diminish electric current by-pass around the bipolar electrode, each electrolysis gap and its opposed anodic surface and cathodic surface comprising a cell, the anodic surface of each cell being individually renewed while the respective anode remains in position, by interrupting flow of the bath of the adjoining electrolysis gaps to and from the bath which is in contact with the respective anodic surface being renewed, and placing a renewal means forming a plate of consumable carbonaceous material adjacent the surface of said respective anodic surface.

25. In a method for producing aluminum by electrolysis of alumina dissolved in a fused bath in which an electric current is passed in series longitudinally through a fixed solid anodic surface, an intervening electrolysis gap of fused bath, through an intermediate fixed solid bipolar electrode providing opposite anodic and cathodic surfaces, a second electrolysis gap of said bath, and through a fixed cathodic surface, the anodic surfaces comprising renewable carbonaceous surfaces consumable in the electrolysis, the improvement comprising collecting and tapping the resulting aluminum, flowing downwardly adjacent the cathodic surfaces, from each of said electrolysis gaps separately, circulating the fused bath, in a closed circuit within the furnace, by removing the fused bath from one electrolysis gap to the next, the removal being at points upwardly removed from the normal level of the collected aluminum, and feeding aluminum oxide at a location in said circuit, the circulation of said bath being obtained by passing overflow of the said bath from one electrolysis gap to the next, by gravity, the overflow being restricted in amount to diminish electric by-pass to a minor amount, a predetermined amount of the bath being lifted from a low point to a high point in the circuit to cause it to recirculate in a predetermined amount per unit time settable independently of the amount of replenishing alumina being introduced into said circuit.

26. The process of claim 25, the lifting being accomplished by collecting the fused bath in a reservoir at the low point, applying pressure of an inert gas to the surface of said reservoir to force the fused bath into a reservoir at the high point, from which it is fed back into the cells.

27. A method according to claim 1 characterized in that the tapping of the metal produced is effected periodically by aspiration out of contact with the bath in the individual cells but at spots kept at a temperature higher than the solidification temperature of the liquids present in the surrounding cells exclusively by indirect heating by said liquids.

28. A method according to claim 2, characterized in that the operation with bath circulation through the cells, in intercommunication, is alternated with operation in conditions similar to those of the static multicell furnace, with cells not in intercommunication, that is, without bath circulation, the passing from one type of operation to the other being obtained by establishing and cutting off, respectively, communication between the cells so as to start and stop respectively the main bath circulation therethrough.

29. A method according to claim 1, characterized in that said lifting of the bath is effected between two intercommunicating contiguous chambers, of which the first has a low bottom and is in communication with and contiguous to the cell having the lowest level, and the second has a high bottom and is in communication with the cell having the highest level in said closed circuit of cells, the lifting being by siphon action, by introducing, at substantially regular time intervals, gas inert to the electrolysis reaction into the first chamber so that by pressure the bath liquid is depressed therein and displaced into the second chamber and from this second chamber discharges into the contiguous cell having the highest level, while reflux of bath liquid into the cell having the lowest level is prevented.

30. A method according to claim 29, wherein the gas used for said displacement is gas developed in the course of electrolysis.

31. A method according to claim 1, characterized in that feeding of material containing aluminum oxide is effected at at least one location in said circuit by causing suitably measured quantities of said material to fall on to a free surface of bath liquid and causing said liquid to flow a certain distance, from the feeding location to its entry into the first cell subsequent to the feeding location.

32. A method according to claim 31 characterized by the feeding of aluminum oxide which contains substantial percentages of impurities constituted mainly by $Fe_2O_3$ and $SiO_2$.

33. A method according to claim 1, characterized in that anodic restoration is effected by applying to the consumed electrodes elements of anodic restoring material having uniform thickness, at such time intervals as to keep the bath thicknesses in the interelectrode gaps between predetermined limits.

34. A method according to claim 1, characterized in that the electric current by-passed through the bath liquid in passage of said liquid from one cell to the next, is not more than 3% of that passing through the furnace between said cells.

35. A method according to claim 1, characterized in that the bath is made to circulate through the cells in a closed circuit in the sense opposed to the conventional sense of passage, anode/bath/cathode, of the electric current.

36. A method according to claim 28, wherein said communication is established and shut off thermally by modifying the insulation of the inter-communication regions by varying the amount of heat insulation thereof with respect to the ambient atmosphere.

37. A method according to claim 28, wherein said communication is established and shut off mechanically by opening and throttling respectively the ducts of communication between the cells.

38. A furnace according to claim 7, characterized in that the communication between the cells of said furnace for the bath flow from one cell to the other, is established by means of ducts provided above the active electrodic surface in the heads of the electrodes, said heads being lined with material which is impermeable and resistant to attack by the fused bath, a good electric insulator and little heat-insulating.

39. A furnace according to claim 7, characterized in that transverse partition walls between cells are constituted below the electrolysis gaps by refractory solid material having high electric resistivity and little porosity and resistant to attack by the components of the fused bath and by the liquid metal; in the electrolysis gaps formed between opposed cathode and anode surfaces, by a relatively thick plate of graphite and electrodic carbon, conductive of heat and electricity, constituting the bipolar electrode between one cell and the other, and above the electrolysis gaps by blocks of massive thickness, apertured for the passage of bath liquid, and of material inert with respect to the bath, of high electric resistivity but heat-conductive.

40. A furnace according to claim 39, characterized in that said inert material is electrofused magnesium oxide.

41. A furnace according to claim 39, characterized in that said inert material is electrofused aluminium oxide.

42. A furnace according to claim 8, characterized by means for throttling individually the ducts for bath circulation between adjacent cells, said means being constituted by plugs slidable in holes provided in the upper parts of said partitions and intersecting said ducts, said plugs being adapted to be fixed at various levels and actuable from above the cells.

43. A furnace according to claim 7, characterized in that said chambers below the electrolysis gaps, for collecting the metallic aluminium, have each a volume larger than the maximum volume attained by the bath in the respective individual cells.

44. A furnace according to claim 17, characterized in that said chamber having the lower bottom is divided by a vertical partition depending from the ceiling into proximity with the bottom, into two compartments, the larger compartment being in communication with the contiguous cell and is provided at its upper part top with an orifice, for the entry of gas, connected with external means for introducing when desired, at regular time intervals, inert gases so as to attain in the compartment a temporary overpressure and the smaller compartment being in communication at its upper part with the chamber having the high bottom.

45. A furnace according to claim 17, characterized in that said chamber having the high bottom is provided with a vent and is dimensioned in such a manner as to enable feeding of the bath liquid to the contiguous cell practically continuously, while the introduction of the bath liquid from the chamber having the low bottom into said chamber having the high bottom takes place at time intervals.

46. A furnace according to claim 19, characterized in that communication between the chamber with the lower bottom and the contiguous cell is afforded by at least one duct provided with a rudimentary ball check valve, said ball being of refractory material unattackable by the bath and lighter than the bath, said valve closing automatically by effect of increase of pressure in said low-bottomed chamber, so as to impede firstly the reflux of bath liquid into the cell and then the discharging of the slightly compressed gas from the low-bottomed chamber towards the cell.

47. A furnace according to claim 46, characterized in that said ball is made of carbon coated with electro-fused MgO.

References Cited in the file of this patent

UNITED STATES PATENTS

| 559,729 | Lorenz | May 5, 1896 |
| 1,387,425 | Merritt | Aug. 9, 1921 |
| 2,451,492 | Johnson | Oct. 19, 1948 |
| 2,480,474 | Johnson | Aug. 30, 1949 |

FOREIGN PATENTS

| 414,988 | Italy | Sept. 13, 1946 |
| 58,956 | Germany | Apr. 11, 1890 |
| 1,061,906 | France | Apr. 16, 1954 |